United States Patent
Quirant et al.

(10) Patent No.: US 7,040,718 B2
(45) Date of Patent: May 9, 2006

(54) CALIBRATION PROCESS FOR A SERVOMOTOR

(75) Inventors: Werner Quirant, Bleistein (DE); Jean-Marc Piel, Drancy (FR)

(73) Assignee: Robert Boch GmbH, Stuttgart (DE)

( * ) Notice: Subject to any disclaimer, the term of this patent is extended or adjusted under 35 U.S.C. 154(b) by 32 days.

(21) Appl. No.: 10/488,734

(22) PCT Filed: Sep. 6, 2002

(86) PCT No.: PCT/FR02/03046

§ 371 (c)(1),
(2), (4) Date: Aug. 12, 2004

(87) PCT Pub. No.: WO03/022653

PCT Pub. Date: Mar. 20, 2003

(65) Prior Publication Data

US 2004/0251739 A1    Dec. 16, 2004

(30) Foreign Application Priority Data

Sep. 11, 2001   (FR) .................................. 01 11761

(51) Int. Cl.
*B60T 8/44* (2006.01)
(52) U.S. Cl. .................................... 303/114.3; 188/356
(58) Field of Classification Search ................. 73/132, 73/121; 303/114.3, 113.3, DIG. 4, 115.1; 188/356

See application file for complete search history.

(56) References Cited

U.S. PATENT DOCUMENTS

| | | | | |
|---|---|---|---|---|
| 5,705,744 A | * | 1/1998 | Brugger et al. | 73/121 |
| 6,511,136 B1 | * | 1/2003 | Gendrin et al. | 303/118.1 |
| 6,516,702 B1 | * | 2/2003 | Stephane et al. | 91/367 |
| 6,741,918 B1 | * | 5/2004 | Kerns et al. | 701/34 |
| 2004/0162652 A1 | * | 8/2004 | Kems et al. | 701/34 |

* cited by examiner

*Primary Examiner*—Devon Kramer
(74) *Attorney, Agent, or Firm*—Leo H McCormick, Jr.; Warren Comstock; Sarah Taylor

(57) ABSTRACT

A calibration process for a pneumatic-assistance servomotor in a braking circuit of a motor vehicle. The values of the output pressure (Pmc) of a hydraulic master cylinder associated with the servomotor and of the negative pressure inside the working chamber of the servomotor are measured and recorded with respect to a given negative-pressure value (Pfc) inside a negative-pressure chamber of a servomotor for several operating points P1, P2, P3, P4 of the servomtotor. The operating points being located on either side of a saturation point to precisely determine the coordinates of the saturation point and thereby provide an accurate control of advanced functions of the servomotor with respect to braking operation, the braking assistance and/or the monitoring of the performance or of the ageing of the servomotor.

7 Claims, 2 Drawing Sheets

CALIBRATION PROCESS FOR A SERVOMOTOR

This invention relates to a calibration process for a pneumatic-assistance servomotor intended for a braking circuit in a motor vehicle.

The pneumatic-assistance servomotor of a braking circuit for a motor vehicle is associated with a hydraulic master cylinder, so as to amplify (or boost) the force exerted on the brake pedal by the vehicle driver, and to transmit this amplified force to the piston of the master cylinder, in order to produce a hydraulic pressure for the application of the vehicle brakes.

The servomotor comprises two chambers, which are separated, in an airtight manner, by a moving partition wall bearing an axial piston, which acts on the piston of the master cylinder. One of these chambers is a negative-pressure chamber, connected to a negative-pressure source, e.g. the inlet manifold of the vehicle engine, whereas the other chamber is a working chamber which, at rest, is connected with the negative-pressure chamber and, on a braking operation, is separated from the negative-pressure chamber and connected to the atmospheric-pressure ambient air, under the control of the brake pedal, depressed by the driver.

In operation, the servomotor amplifies the force exerted on the pedal, proportionally to the pressure difference between the chambers, and the amplification reaches its maximum value when the pressure within the working chamber is equal to the atmospheric pressure, which means that the servomotor is at a saturation point. Beyond such point, the servomotor no longer amplifies the force exerted on the pedal.

It has already been suggested that a complemental braking assistance be provided for via other means, such as a hydraulic pump, the operation of which results in a higher hydraulic pressure for the application of the brakes. Yet, for such an assistance changeover not to be felt by the driver, the assistance provided by the complemental assistance means at the beginning of their functioning must be substantially the same as that supplied by the servomotor at the saturation point, which implies that the saturation point of the servomotor has to be determined with an adequate accuracy.

In a well-known manner in the art, a characteristic saturation curve for a pneumatic-assistance servomotor is determined on the basis of the dimensioning of such servomotor. However, owing to both the very nature of the servomotors and their manufacturing, there is a relatively great scattering of the actual saturation curves compared with the theoretical curve, and such a difference may be as great as 4 bars, as regards the output pressure of the master cylinder, which is far from negligible and, besides, quite perceptible to the driver as he depresses the brake pedal.

Therefore an object of this invention consists, in particular, in avoiding such a drawback.

To this end, the invention provides a process for an accurate determination of the saturation curve of a servomotor for the pneumatic assistance of a braking circuit in such a way that, more especially, a complemental braking assistance may be exercised without it being perceptible to the vehicle driver.

Therefore, the present invention provides a calibration process for a pneumatic-assistance servomotor, said servomotor comprising a negative-pressure chamber, intended to be connected to a negative-pressure source, and a working chamber to be selectively connected with the negative-pressure chamber or to the atmospheric-pressure ambient air, wherein the chambers are separated by a moving partition wall bearing an axial piston for the actuation of a hydraulic master cylinder, characterised in that said process consists in measuring and recording, for a predetermined negative pressure inside the negative-pressure chamber, the coordinates of several points of a characteristic operating curve of the servomotor, using an orthonormal plot of axes, representing an input parameter of the servomotor and an output parameter of the servomotor or of the master cylinder associated with the servomotor, said operating points being located beyond a jump phase and on either side of a saturation point on said operating curve.

The measuring and recording operations may be carried out on a relatively simple measuring bench, e.g. situated at the exit from the servomotor production line or in an assembly line, in which the servomotors are installed in motor vehicles. The operating points, the coordinates of which are measured and recorded, make it possible to determine, in a fully-automated manner using data processing means, the whole characteristic operating curve of the servomotor for a predetermined value of the negative pressure prevailing inside the negative-pressure chamber of the servomotor.

Most advantageously, the measured and recorded parameters are physical quantities, which are available and measurable in a motor vehicle equipped with said servomotor and said master cylinder.

In a preferred manner, the above-mentioned input parameter is the negative pressure inside the working chamber of the servomotor, and the output parameter is the output force of the servomotor or the output hydraulic pressure of the master cylinder associated with the servomotor.

Advantageously too, two sensors, which the servomotor and the master cylinder are usually fitted out with, may be used to measure and record the values of said parameters.

Thus and more specifically, the values of the input and output parameters may be measured and recorded as regards two points, which are situated between the jump phase and the saturation point on the characteristic curve and, besides, as concerns two other points, located beyond the saturation point.

Therefore, the position of the saturation point on this characteristic operating curve may be calculated precisely.

Afterwards on this basis, the characteristic saturation curve of the servomotor may be determined accurately and said curve may be turned to account for an accurate control of the advanced functions, in particular the braking assistance, the complemental braking assistance, the monitoring of the performance or of the ageing of the servomotor, etc.

These, as well as other features, characteristics and advantages of the present invention will be more apparent from the following detailed description, by way of example, when taken in conjunction with the accompanying drawings, in which.

Figure 1:
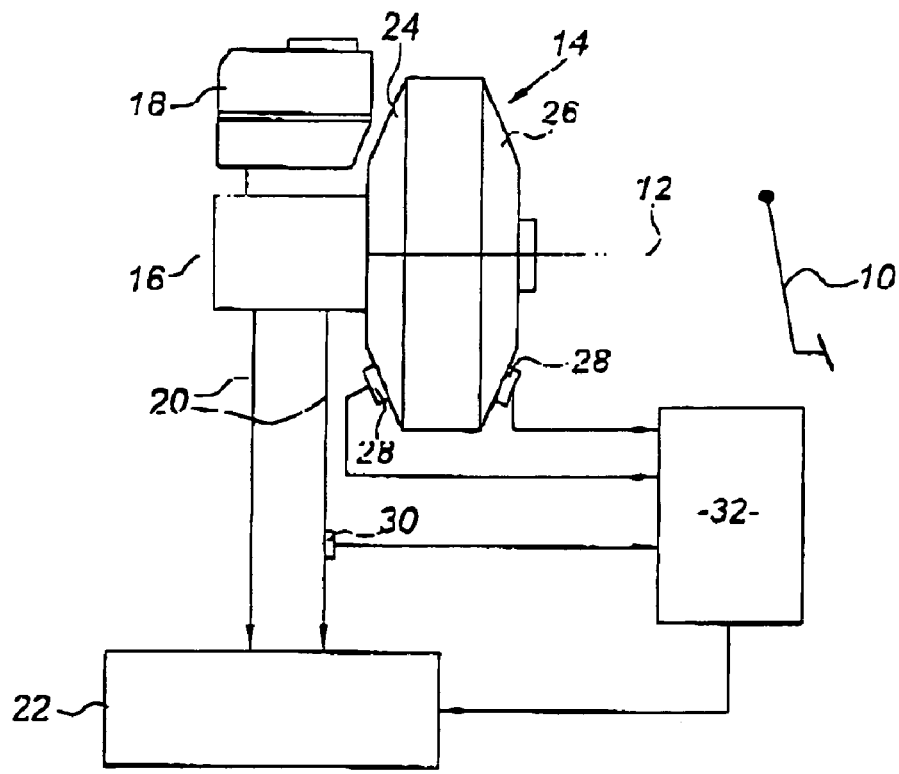
FIG. 1 is a partial schematic view of a braking circuit for a motor vehicle, to which the present invention is applicable.

The braking circuit of a motor vehicle, as diagrammatically shown in FIG. 1, comprises a brake pedal 10, connected through a control rod 12 to an axial piston of a pneumatic-assistance servomotor 14, associated with a hydraulic master cylinder 16, which is supplied with brake fluid by a fluid tank 18 and the outlet pipes 20 of which are connected to wheel-braking means 22.

The servomotor 14 comprises a front chamber or negative-pressure chamber 24, which is connected to a negative-pressure source, such as the inlet manifold of the internal-combustion engine of the vehicle, and a rear chamber or working chamber 26, which is selectively interconnected with the negative-pressure chamber 24, or connected to the atmospheric-pressure ambient air, both chambers being defined, in an airtight manner, by a moving partition wall, the middle part of which bears the axial piston of the servomotor 14. The control rod 12, connected to the brake pedal 10, acts on the axial piston of the servomotor which, in turn, acts on the primary piston of the master cylinder 16.

Pressure sensors 28 are fitted inside the chambers 24 and 26 of the servomotor 14, and a hydraulic-pressure sensor 30 is provided on an outlet pipe 20 of the master cylinder 16. The sensors 28 and 30 output signals, on the one hand, Pfc indicative of the pressure within the front chamber 24 of the servomotor 14 and Prc indicative of the pressure inside the working chamber 26 and, on the other hand, Pmc indicative of the hydraulic pressure at the exit from the master cylinder, and these signals are applied to inputs of data-processing means 32, programmed so as to actuate, if necessary, means capable of increasing the hydraulic pressure in the braking means 22, for instance a hydraulic pump, forming part of a circuit of the ABS or ESP type.

When the driver depresses the brake pedal 10, the working chamber 26, which was connected with the negative-pressure chamber 24, is separated from the latter and then connected to the atmospheric-pressure ambient air, with the result that the pressure progressively increases in the working chamber 26, whereas the value of the pressure, prevailing inside the chamber 24, is lower than that of the atmospheric pressure and is, for instance, equal to the negative-pressure in the inlet manifold of the internal-combustion engine of the vehicle.

The pressure difference between the chambers 24 and 26 of the servomotor 14 amplifies the force, which is transmitted by the control rod 12 to the piston of the servomotor, with the result that the force, applied to the primary piston of the master cylinder 16, is equal to the force exerted on the control rod 12, multiplied by an amplification coefficient, proportional to the pressure difference between the chambers of the servomotor. When the pressure inside the working chamber 26 reaches the atmospheric pressure, the amplification through the servomotor is at its maximum value and accordingly the servomotor is said to be saturated.

If a further braking assistance must be provided, in that case such a complemental assistance is produced through an increase of the hydraulic pressure in the braking means 22, as a result of the actuation of the above-mentioned pump, which is controlled by the means 32.

It is essential that the driver, exerting a braking force on the brake pedal 10, should not notice the changeover from the assistance provided by the servomotor 14 to that provided by complemental means. As a matter of fact, the driver might take this feeling for a fault in the braking system and be led to release the braking force applied to the pedal 10, with the conceivable attendant consequences of such an action.

In order to avoid said difficulty, the assistance provided by the complemental means at the beginning of their operation must match the assistance provided by the servomotor 14 at the saturation point, which means that said saturation point must be known with a certain accuracy.

To this end, according to the invention, some points of an operating curve of the servomotor 14 are measured and recorded and, in an advantageous manner, such measuring and recording operations are carried out at the factory, either at the end of the manufacturing of the servomotor or at the time of its installation in a motor vehicle.

Figure 2:
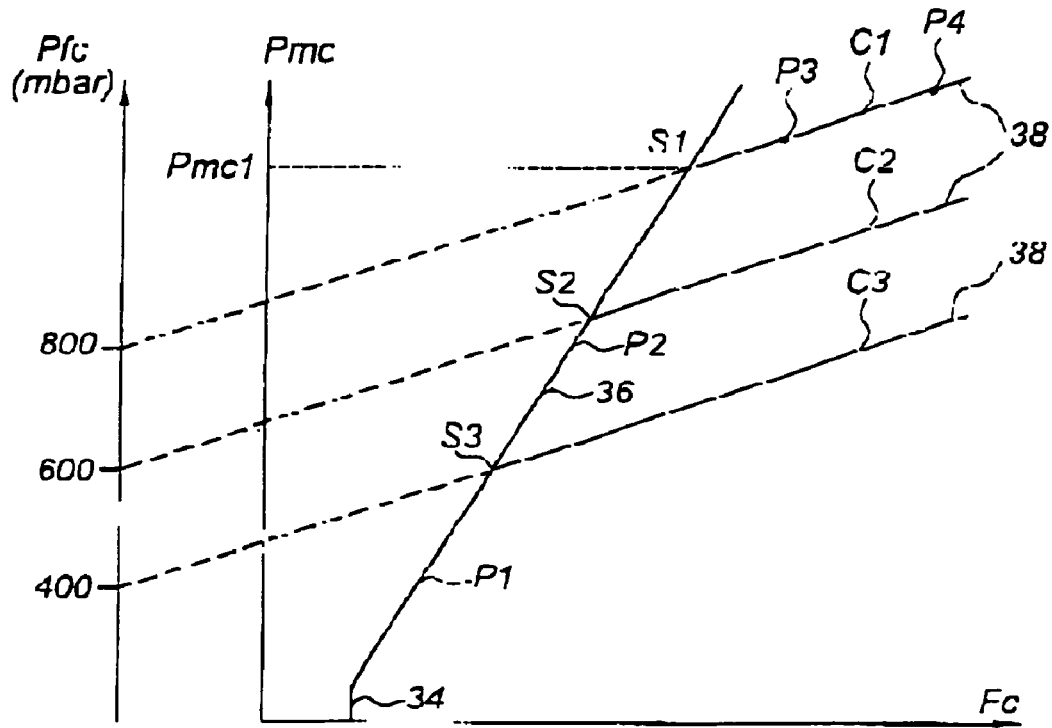
FIG. 2 is a graph in which the variation curves of the output hydraulic pressure of the master cylinder are plotted versus the force exerted on the pedal.

FIG. 2 shows a system of operating curves of a servomotor 14 diagrammatically. Such operating curves represent the change in the hydraulic pressure Pmc at the exit from the master cylinder 16 associated with the servomotor 14, as a function of the input force Fe, which is applied to the axial piston of the servomotor 14 by the control rod 12, and also as a function of the negative pressure prevailing inside the chamber 24 of the servomotor.

The system of curves C1, C2 and C3 shown in FIG. 2 was plotted for negative pressures inside the chamber 24, equal to 800, 600 and 400 mbars respectively, each curve comprising a first portion 34, the so-called jump phase, a second portion 36 representing the amplification of the input force Fe by the servomotor 14 as a function of the negative pressure prevailing inside the front chamber 24, and a third portion 38, which corresponds to the operation when the servomotor 14 is saturated. As regards this third portion 38, the amplification of the input force Fe is due to the dimensioning of the master cylinder 16 and it actually corresponds to a section ratio which is different from 1.

On each curve, the saturation point, namely S1, S2 and S3 respectively, is defined by the intersections of the second and third portions 36, 38 of the curve.

On saturation, the pressure inside the working chamber 26 is equal to the atmospheric pressure and the pressure difference between the chambers 24 and 26 is equal to the negative pressure inside the negative-pressure chamber 24. Therefore, the values of said negative pressure clearly stand out from FIG. 2, in that they are plotted along an axis Pfc parallel to the ordinate axis Pmc, using broken lines drawn in continuation of the third portions 38 of the curves C1, C2 and C3.

According to this invention, an operating curve should be determined and recorded for every servomotor 14, on the basis of a given value of the negative pressure inside the chamber 24, for instance 800 mbars, which corresponds to the curve C1 in FIG. 2. In order to do so, the coordinates of two points P1 and P2 on the second portion 36 of the curve C1 are measured and recorded, and so it is with two other points P3 and P4 located on the third portion 38 of the curve C1.

Preferably, these coordinates are values of physical quantities, both available and measurable in the motor vehicle equipped with the braking system as shown in FIG. 1.

In an advantageous manner too, the values of these physical quantities are measured using means, which are already provided in the braking system, such as the pressure sensors 28 and 30.

Therefore, it is not the force Fe which will be measured as an input but instead the pressure Prc inside the working chamber 26 of the servomotor and, as an output, it will be the hydraulic pressure Pmc at the exit from the master cylinder 16.

These pairs of values, obtained for the points P1, P2, P3 and P4, make it possible to draw the portions 36 and 38 of the curve C1 and hence to determine the location of the saturation point S1, marked by the intersection of the portions 36 and 38.

The system of curves in FIG. 2 shows that the third portions of the curves C1, C2 and C3 are mutually parallel and that they also connect with the same second portion 36.

Thus, on the basis of the curve C1 using the reference Fe (or Prc), Pmc and the axis Pfc, all the curves C2, C3, ... can be determined for values of Pfc equal to 600, 400, ... mbars and accordingly all the saturation points S2, S3, ... of the servomotor 14 can also be determined for all the values of Pfc.

When the values Pmc, corresponding to these saturation points, are known from calculations, a further assistance, provided beyond the saturation point, may be controlled accurately without any discontinuities in the assistance on the saturation point crossing.

Figure 3:
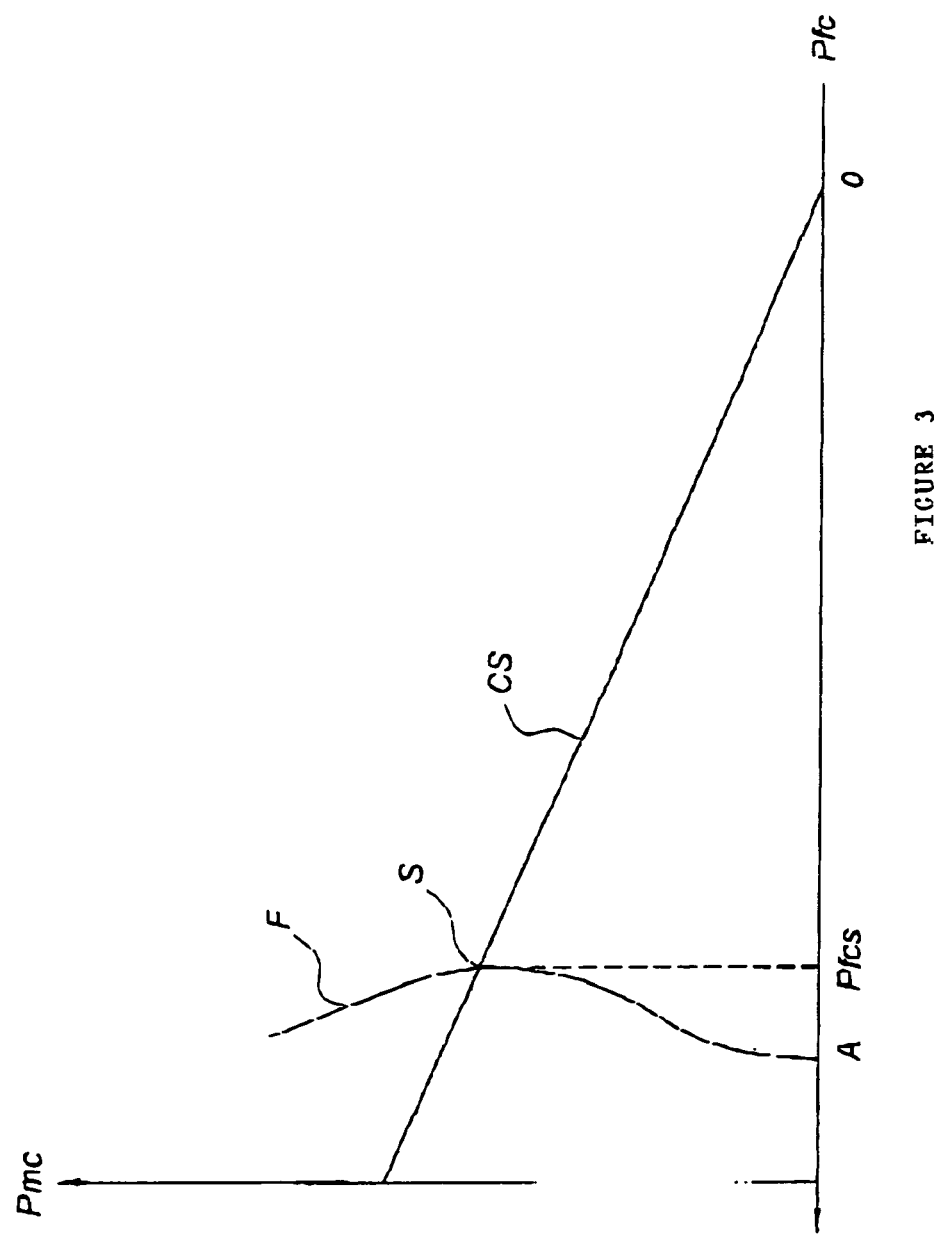
FIG. 3 is a graph showing the characteristic saturation curve of the pneumatic-assistance servomotor, and a braking curve.

It is also possible, as illustrated in FIG. 3, to draw a saturation curve CS of the servomotor 14, which indicates the values of the pressure Pmc at the outlet of the master cylinder 16, dependent on the negative pressure Pfc inside the chamber 24 of the servomotor 14.

Thanks to the precise knowledge of said saturation curve CS, the control of means providing a further assistance beyond the saturation point of the servomotor 14, may be determined accurately, so as to avoid such a discontinuity in the assistance.

FIG. 3 also shows a braking curve F, representing the change in the pressure Pmc at the outlet of the master cylinder 16, as a function of the value of the negative pressure Pfc inside the chamber 24 of the servomotor in the course of a braking operation. The curve F, beginning at A, intersects the saturation curve CS at a point S, which is the saturation point of the servomotor 14, corresponding to the value of the negative pressure Pfcs inside the chamber 24 of the servomotor. The braking force, exerted by the driver of the vehicle on the brake pedal 10, is amplified by the servomotor 14 between the points A and S and it may be further amplified by other means, such as a hydraulic pump, beyond the point S if necessary.

The accurate determination of the location of the saturation point S also makes it possible to monitor the performance of the servomotor 14 and its ageing with time, and consequently to draw attention to a failure or a fault in the servomotor, in due time.

The invention claimed is:

1. A calibration process for a pneumatic-assistance servomotor for a braking circuit of a motor vehicle, said servomotor (14) comprising a negative-pressure chamber (24) that is connected to a negative-pressure source and a working chamber (26) that is selectively connected with the negative-pressure chamber or to atmospheric-pressure ambient air, wherein said chambers are separated by a moving partition wall bearing an axial piston for the actuation of a hydraulic master cylinder (16), characterised in that said process consists in measuring and recording, for a determined negative pressure inside the negative-pressure chamber (24), the coordinates of several points of an operating curve of the servomotor, using an orthonormal plot of axes, representing an input parameter of the servomotor and an output parameter of the servomotor or of the master cylinder associated with said servomotor, each of said several points being located beyond a jump phase and on either side of a saturation point on said operating curve and representing measured and recorded values of said input and output parameters as regards to two points (P1, P2) of the operating curve situated between the jump phase and a saturation point and two other points (P3, P4), located beyond the saturation point.

2. The process according to claim 1, characterised in that said parameters are physical quantities, which are available and measurable in a motor vehicle equipped with said servomotor and with said master cylinder.

3. The process according to claim 1, characterised in that the input parameter is the negative pressure inside the working chamber (26) of the servomotor (14).

4. The process according to claim 1, characterised in that the output parameter is an output force of the servomotor (14) or an output hydraulic pressure of the master cylinder (16).

5. The process according to claim 1, characterised in that next the coordinates of the saturation point on said operating curve are calculated precisely.

6. The process according to claim 5, characterised in that next a characteristic saturation curve of the servomotor (14) is determined.

7. The process according to claim 6, characterised in that next, coordinates of the saturation point of the servomotor are turned to account for an accurate control of advanced functions, as concerns a braking operation, a complemental braking assistance and/or a monitoring of the performance or of the ageing of the servomotor.

* * * * *